June 30, 1925.  
J. B. ARPIN  
CENTRIFUGAL SEPARATOR  
Filed July 28, 1922
1,544,366
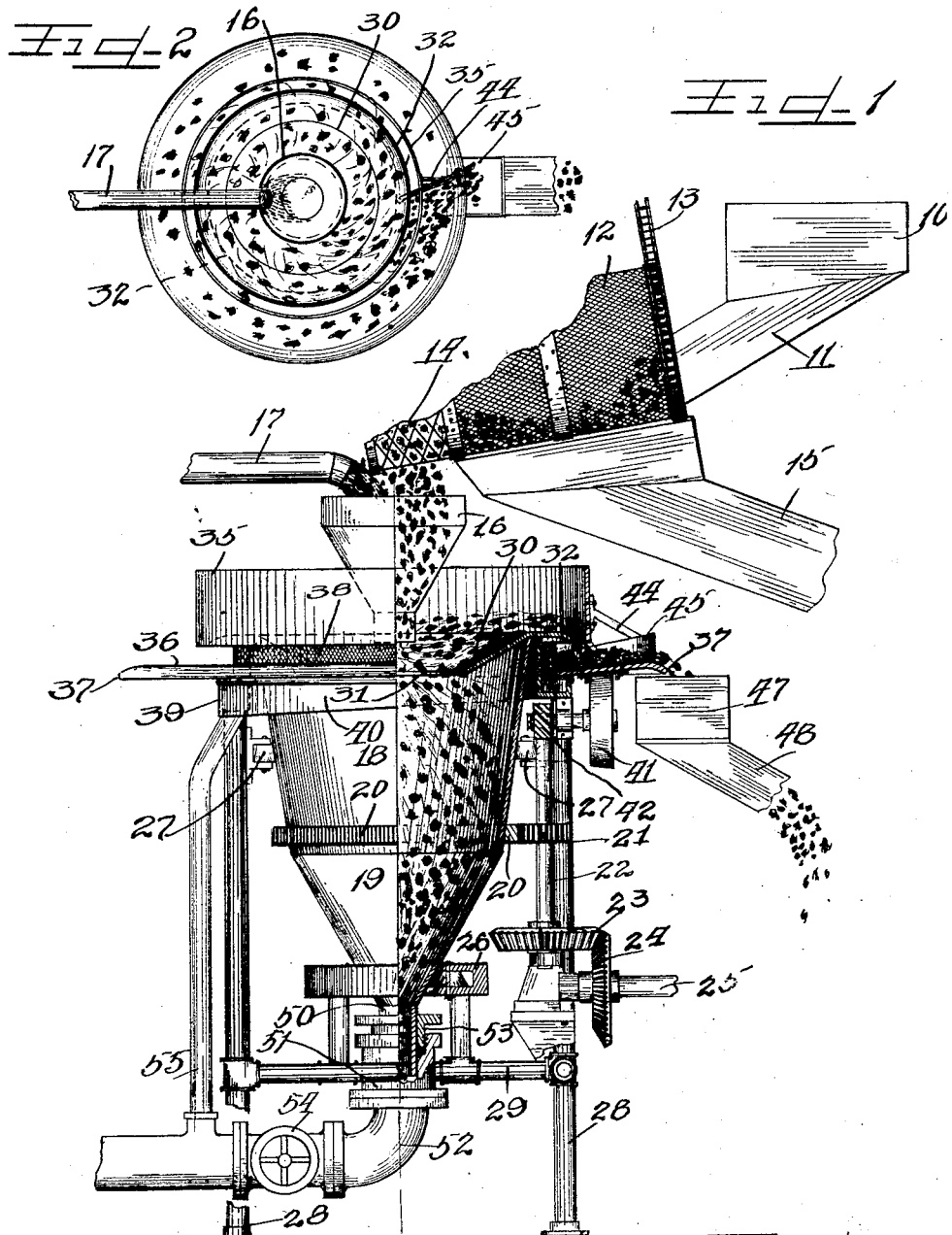

Patented June 30, 1925.

1,544,366

UNITED STATES PATENT OFFICE.

JOHN B. ARPIN, OF WISCONSIN RAPIDS, WISCONSIN.

CENTRIFUGAL SEPARATOR.

Application filed July 28, 1922. Serial No. 578,069.

*To all whom it may concern:*

Be it known that I, JOHN B. ARPIN, a citizen of the United States, and a resident of Wisconsin Rapids, in the county of Wood and State of Wisconsin, have invented a new and useful Centrifugal Separator; and I do hereby declare that the following is a full, clear, and exact description of the same, reference being had to the accompanying drawings, and to the numerals of reference marked thereon, which form a part of this specification.

This invention relates to machinery for the purpose of separating mixtures of material, particularly material containing heavy and light particles, such as ashes.

It is an object of this invention to provide a convenient and compact apparatus for separating the coke in the ashes from the clinkers therein.

It is a further object of this invention to effect said separation by the selective action of a rotating body of water.

It is a further object of this invention to provide means whereby the mixture of material can be made to fall through a vessel containing water and rotating so that the lighter material will be moved to the circumferential part of the top of the water, while the heavier material will descend to the bottom near the center.

It is a further object of this invention to provide convenient means for supporting and rotating such a vessel.

It is a further object of this invention to provide convenient arrangements for removing the lighter material and separating it from the water.

Other and further important objects of the invention will be apparent from the disclosures in the accompanying drawings and the following specification.

The invention (in a preferred form) is illustrated in the drawings and hereinafter more fully described.

On the drawings:

Figure 1 is a view of the apparatus partly in elevation and partly in section.

Figure 2 is a top plan view of the portion of the apparatus which is filled with water and rotates.

As shown on the drawings:

A hopper 10 is provided for receiving the ashes. From this hopper goes a chute 11 leading the ashes to a sieve 12 which is rotated about an oblique axis by means of a sprocket chain 13. This sieve is made up of portions of finer mesh and a portion 14 of coarser mesh. A chute 15 is provided for conveying away the material which passes through the finer meshes. The material from the coarser mesh is received in a funnel 16, into which also a pipe 17 delivers a stream of water.

The funnel 16 delivers into a rotating separator 18 of a general conical form, the lower portion 19 of which tapers more rapidly than the upper part of the separator. This separator is driven by a gear 20 integral therewith surrounding the separator at a point near the change in taper. This is driven by a spur gear 21 on a shaft 22, which shaft may be driven in any desired fashion. As illustrated, it is driven by a bevel gear 23 meshing with a bevel gear 24 upon a shaft 25 which may be connected to any suitable source of power. Anti-friction rollers 26 near the lower end of the separator and other rollers 27 near the upper end thereof are supported in any suitable frame. The frame illustrated includes legs 28 and cross-pieces 29.

The upper edge of the separator is provided with an annular flange 30, which extends inward and downward to an edge 31; it also extends outward and very slightly downward to an edge 32.

The flange 30 forms a basin constituting an upper division of the separator 18 and communicating with the rest of the separator through the central opening bounded by the edge 31. It is secured to the rotating separator itself by any suitable means, for example, by being spot-welded to an outstanding flange 33 upon the upper edge of the body 18 of the separator. The edge 32 of the flange 30 is surrounded by a stationary apron or guard plate 35 supported in any desired manner. Below the guard plate is an annular traveling platform 36 which slopes gradually downward to its inner edge which is slightly nearer the center of the machine than is the outer edge 32 of the flange 30. The outer edge of the platform 36 is turned downward, as shown at 37, so that it reaches about to the same level as the inner edge. The inner edge is supplied with an upstanding screen 38 which extends to or above the height of the edge 32.

Between the inner edge of the platform 36 and the main body of the separator is a drainage trough 39. The inner wall of this trough extends nearly to the flange 33. The outer wall extends nearly to the platform 36. The bottom wall is higher at one side of the machine than at the opposite side and slopes between these two points as may be seen at 40. The platform 36 is driven by a rotating beveled wheel 41 upon a horizontal shaft driven by the helical gear 42 upon the vertical shaft 22. Supported from the guard piece 35 by means of braces 44 is a scraper 45 which is at an angle to the radius of the platform 36. It is also at an angle to the horizontal so that it contacts with the sloping surface of the platform 36. Under the outer edge end of the scraper 45 is a receiving box 47 which by a chute 48 delivers the coke.

The lower end of the tapering portion 19 of the main body of the separator is provided with a cylindrical delivery spout 50 which is received within a cylindrical stationary end fixture 51 for the pipe 52. The end fixture 51 is provided with a packing gland 53. The delivery pipe 52 is provided with a gate 54 and there is a branch pipe 55 connecting the lowest point of the drainage trough 39 with the delivery pipe 52 beyond the gate.

In the operation of the device, ashes are dumped into the hopper 10 and travel by the chute 11 into the sieve 12. The rotation of this sieve causes the finer parts of the ashes to pass out into the chute 15 where they are delivered separate from all other material. The parts of the ashes which pass through the meshes of the coarse part 14 of the sieve fall into the funnel 16, where they mingle with water from the pipe 17. The mixture passes through the lower end of the funnel to the center part of the rotating separator. The rotation of this separator causes the water contained therein to rotate. The resulting centrifugal force causes the materials to move outward. The lighter of these materials will move outward faster than they descend, but the heavier materials will descend faster than they move outward. The descent is caused partly by gravity and partly by the downward motion of the water. The rate of the downward movement of the water can be controlled by partly closing the gate 54. The line of demarcation between lighter material and heavier may be regulated according to the percentage result desired in the two parts of the mixture.

The lighter material having moved outward by centrifugal force contacts with the sloping part of the flange 30 and is moved up this slope and across the horizontal part of this flange and delivered against the guard plate 35, from which it falls between the lower edge of the guard plate 35 and the outer edge 32 of the flange 30. This lighter material consists principally of coke and it is received upon the moving platform 37. The motion of this platform causes the coke to impinge against the stationary scraper 45 and so be pushed off where it falls into the receiving box 47 and is delivered through the chute 48 to whatever receptacle is provided for the coke. The cinders and other heavy and coarse parts of the ashes are delivered to the pipe 52 along with the water and may be separated from the water by settling tanks, screens or in any other desired manner.

I am aware that numerous details of construction may be varied through a wide range without departing from the principles of this invention, and I therefore do not purpose limiting the patent granted otherwise than is necessitated by the prior art.

I claim as my invention:

1. In a device for recovering coke from ashes, a vessel, means for rotating said vessel about a vertical axis, a flange projecting into said vessel, means for supplying water and ashes to said vessel at a point above said flange, means below said flange for conducting away from the vessel the water and heavier portions of the ashes, and means surrounding said vessel for conducting away the portion of the ashes received above the said flange.

2. In a device for separating coke from ashes, a vessel mounted for rotation about an axis, a flange extending from the upper edge of said vessel inwardly and downwardly toward the axis thereof, a guard plate surrounding the outer edge of said flange, a platform sloping downwardly and inwardly and located below said guard plate, and a screen on the inner edge of said platform, and a drainage conduit below and within said screen.

3. In a device for separating coke from ashes, a vessel mounted for rotation about an axis, a flange extending from the upper edge of said vessel inwardly and downwardly toward the axis thereof, a guard plate surrounding the outer edge of said flange, a platform sloping downwardly and inwardly and located below said guard plate, and a screen on the inner edge of said platform, a drainage conduit below and within said screen, and means for removing from said platform the solid materials deposited thereon.

4. A centrifugal separator comprising a rotatable vessel, a partition plate extending conically from the upper edge of said vessel toward the axis thereof, means for supplying the material to be separated to said vessel at a point above the inner edge of said partition plate, delivery means at the lower end of said vessel, and means for regulating the flow through said delivery means.

5. A centrifugal separator comprising a rotatable vessel, a partition plate extending conically from the upper edge of said vessel toward the axis thereof, means at the upper end of said vessel for introducing a mixture of material and water, delivery means at the lower end of said vessel, and means for regulating the flow through said delivery means.

6. In a centrifugal separator, a round basin opening upward and having a central opening in its bottom, means for rotating said basin about a vertical axis, means for delivering a freely falling stream of liquid mixed with solids to said basin, means for maintaining a rotating body of liquid below said basin and extending into said central opening, said means permitting downward flow of said liquid and means for regulating the vertical flow of said rotating body of liquid.

7. In a hydraulic separation device an upright container having an open mouth, a conduit leading to a point above said mouth, a conduit leading from the bottom of said container, means for rotating said container whereby liquid falling into said container from said first named conduit will be given a rotary movement during its passage through said container, and a dividing flange extending inward from the edge of said mouth.

8. In a hydraulic separation device, means for producing a freely falling stream of liquid and solid, means for imparting an outward centrifugal movement to such stream, means for checking the downward movement of said stream, and means for regulating the ratio between these two movements.

9. The method of separating solid materials which consists in causing them to enter a downward current of liquid giving to the downwardly moving mixture a rotary movement whereby a radial outward movement is imported to the liquid, separating the part of the solids that yields most readily to said outward movement from that having greatest downward movement, permitting free flow of the liquid carrying said first named part and restricting the flow of the liquid carrying last named part to control the ratio between the two parts.

10. A centrifugal separator comprising a rotatable vessel, a partition plate extending conically from the upper edge of said vessel toward the axis thereof, means at the upper end of said vessel for introducing a mixture of material and water substantially vertically downward and centrally with respect to said vessel and at a point above the inner edge of said partition plate, delivery means at the lower end of said vessel, and means for regulating the flow through said delivery means.

In testimony whereof I have hereunto subscribed my name in the presence of two subscribing witnesses.

JOHN B. ARPIN.

Witnesses:
L. G. ARPIN,
CARL J. ARPIN.